(12) United States Patent
Wiesner et al.

(10) Patent No.: US 9,606,888 B1
(45) Date of Patent: Mar. 28, 2017

(54) HIERARCHICAL MULTI-CORE DEBUGGER INTERFACE

(71) Applicant: Marvell International Ltd., Hamilton (BM)

(72) Inventors: Robert Wiesner, Chandler, AZ (US); Guido Kehrle, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 240 days.

(21) Appl. No.: 14/147,056

(22) Filed: Jan. 3, 2014

Related U.S. Application Data

(60) Provisional application No. 61/749,035, filed on Jan. 4, 2013.

(51) Int. Cl.
*G06F 11/27* (2006.01)
*G06F 11/32* (2006.01)

(52) U.S. Cl.
CPC .................................. *G06F 11/321* (2013.01)

(58) Field of Classification Search
USPC ........................................................... 714/30
See application file for complete search history.

(56) References Cited

U.S. PATENT DOCUMENTS

| | | | | |
|---|---|---|---|---|
| 6,957,395 B1* | 10/2005 | Jobs | ...................... | G06F 3/0481 715/700 |
| 7,269,797 B1* | 9/2007 | Bertocci | ............... | G06F 3/0481 715/783 |
| 7,665,002 B1* | 2/2010 | White | .............. | G01R 31/31705 714/727 |
| 2006/0059286 A1* | 3/2006 | Bertone | .............. | G06F 9/30014 710/260 |
| 2006/0259701 A1* | 11/2006 | Sohm | ................... | G06F 12/0897 711/122 |
| 2008/0010493 A1* | 1/2008 | Watanabe | ........... | G06F 11/3664 714/4.1 |
| 2011/0169840 A1* | 7/2011 | Bakalash | .................. | G06T 1/00 345/505 |
| 2012/0173825 A1* | 7/2012 | Ehrlich | ................. | G06F 11/362 711/145 |
| 2012/0210103 A1* | 8/2012 | Liao | ..................... | G06F 11/3632 712/227 |
| 2013/0139002 A1* | 5/2013 | Huang | ................ | G06F 11/3656 714/30 |
| 2013/0238933 A1* | 9/2013 | Shin | ........................ | G06F 11/27 714/30 |

* cited by examiner

*Primary Examiner* — Kamini Patel

(57) ABSTRACT

A hierarchical multi-core debugger interface is described that is configured to enable debugging of a multi-core device. In some implementations, a multi-core debugger renders core-specific user interface components with a core-specific visual characteristic in the hierarchical multi-core debugger interface. In other implementations, the multi-core debugger renders core-specific user interface components in core-specific windows in the hierarchical multi-core debugger interface. In still other implementations, the multi-core debugger renders core-specific user interface components in core-specific windows in the hierarchical multi-core debugger interface, where each core-specific window is displayed with a core-specific visual characteristic.

20 Claims, 5 Drawing Sheets

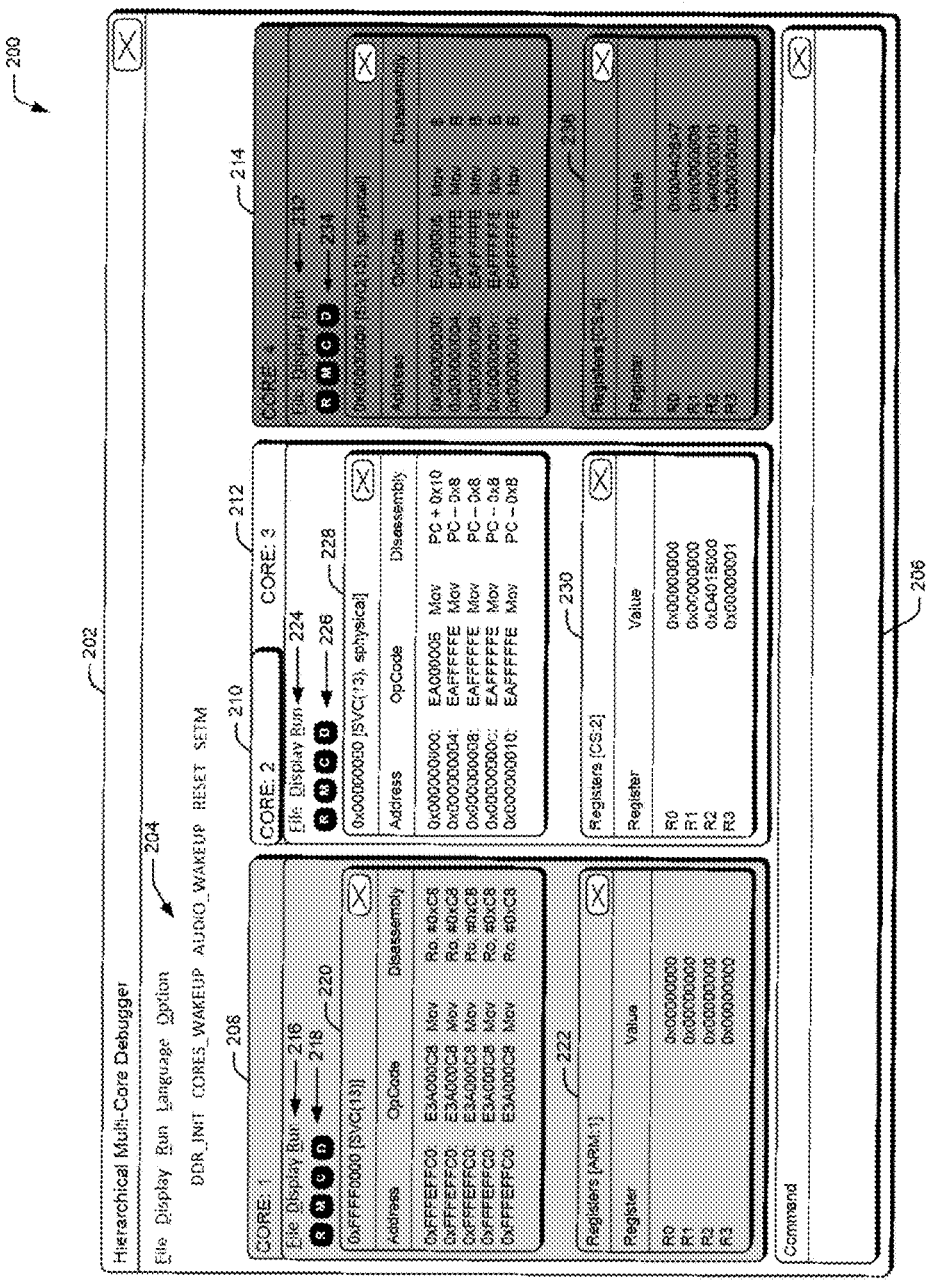
REPLACEMENT SHEET
Fig. 2

HIERARCHICAL MULTI-CORE DEBUGGER INTERFACE

RELATED APPLICATIONS

This present disclosure claims priority to U.S. Provisional Patent Application Ser. No. 61/749,035 filed Jan. 4, 2013, the disclosure of which is incorporated by reference herein in its entirety.

BACKGROUND

Ever-increasing user expectations for high performance and increased feature sets have led to the inclusion of multi-core processors in most computing devices. These multi-core processors often enable mobile or low-power computing devices to perform tasks once reserved for full-power desktop computers or servers.

A multi-core debugger can be used to debug a multi-core device such as a system-on-chip with multiple processing cores. Conventional multi-core debuggers present a debugging user interface that includes information useful during debugging for one or more of the multiple processing cores. Some conventional multi-core debuggers use one debugger per core, and thus require multiple debuggers to debug a single multi-core device. Other conventional multi-core debuggers are configured to connect to multiple cores, but present a debugging user interface that includes information regarding a single core at one time. Still other conventional debuggers can only connect to one core, and thus only present information regarding a single core in the user interface. Thus, these conventional multi-core debuggers do not support efficient multi-core debugging because the debugging user interface presents information corresponding to a single core.

SUMMARY

This summary is provided to introduce subject matter that is further described below in the Detailed Description and Drawings. Accordingly, this Summary should not be considered to describe essential features nor used to limit the scope of the claimed subject matter.

A hierarchical multi-core debugger interface is described that is configured to enable debugging of a multi-core device. In some implementations, a multi-core debugger renders core-specific user interface components with a core-specific visual characteristics in the hierarchical multi-core debugger interface. In other implementations, the multi-core debugger renders core-specific user interface components in core-specific windows in the hierarchical multi-core debugger interface. In still other implementations, the multi-core debugger renders core-specific user interface components in core-specific windows in the hierarchical multi-core debugger interface, where each core-specific window is displayed with a core-specific visual characteristic.

A method is described for establishing a connection with a multi-core device, rendering, in a first core-specific window of a debugger interface, core-specific user interface components corresponding to a first core of the multi-core device, and rendering, in a second core-specific window of the debugger interface, second core-specific user interface components corresponding to a second core of the multi-core device.

An additional method is described for establishing a connection with a multi-core device, assigning a first unique visual characteristic to a first core of the multi-core device, assigning a second unique visual characteristic to a second core of the multi-core device, rendering, in a debugger interface, first user interface components corresponding to the first core using the first unique visual characteristic, and rendering, in the debugger interface, second user interface components corresponding to the second core using the second unique visual characteristic.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

FIG. 2 illustrates an example of a hierarchical multi-core debugger interface in accordance with one or more aspects.

DETAILED DESCRIPTION

Many conventional multi-core debuggers do not support efficient multi-core debugging because the debugger interface presents information corresponding to a single processing core. Some recent debuggers present information corresponding to multiple cores in the debugger interface. In these cases, however, the information is presented without any core-specific grouping and using a similar monochromatic layout, which makes it difficult for the user to determine the association between the information and each core.

This disclosure describes a hierarchical multi-core debugger that renders a debugger interface for debugging multi-core devices. The debugger interface is rendered such that core-specific user interface (UI) components corresponding to each core are displayed with a unique visual characteristic. These unique visual characteristics act to visually associate the core-specific UI components with their respective core, and to visually distinguish the core-specific components from the components associated with other cores. Alternately or additionally, the debugger interface is rendered such the core-specific UI components are displayed in core-specific windows corresponding to each core. Thus, the debugger interface enables more efficient and accurate debugging of multi-core devices by allowing the user to easily distinguish between the multiple cores of the multi-core device.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
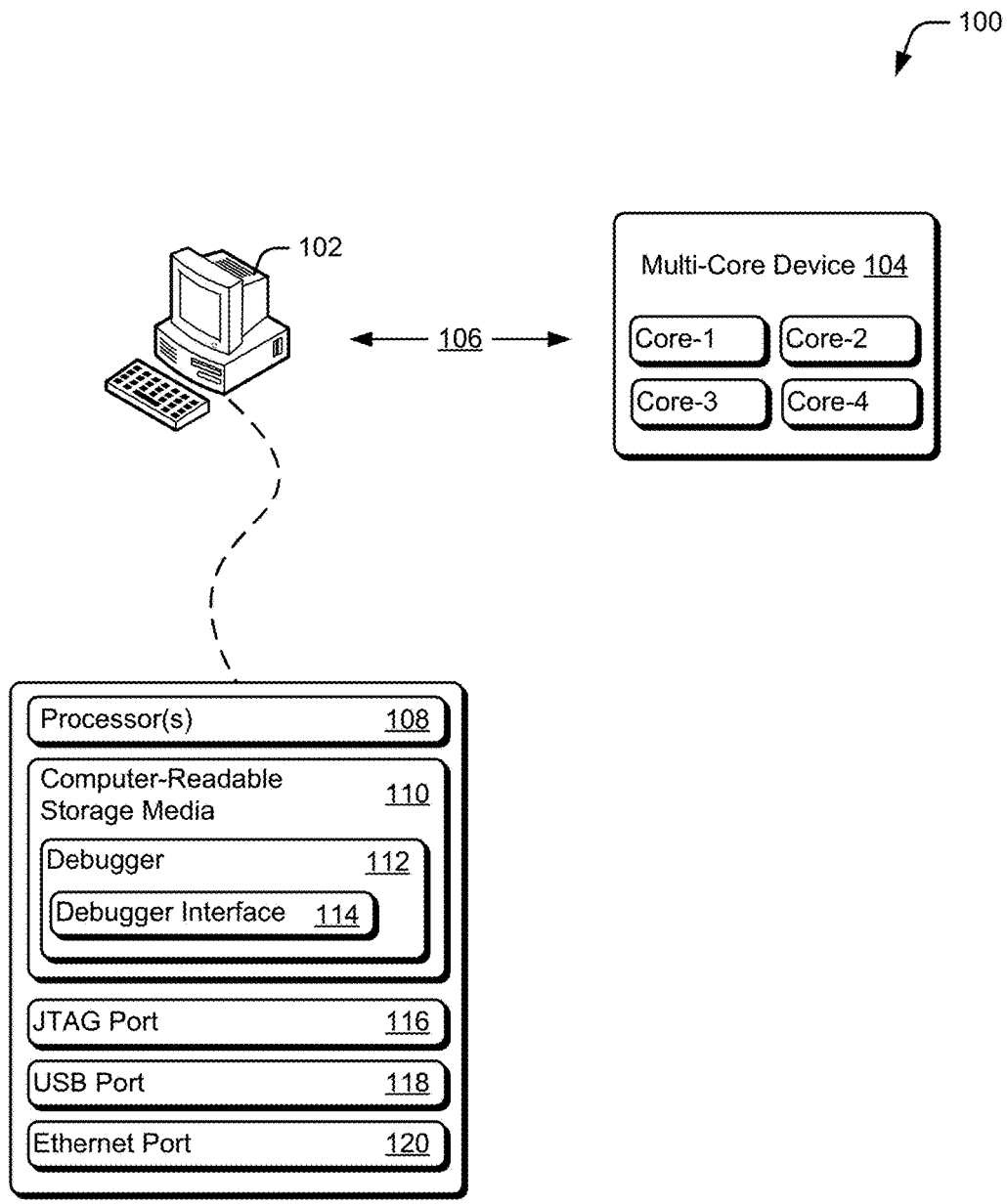
FIG. 1 illustrates an operating environment having a debugger host device and a multi-core device in accordance with one or more aspects.

FIG. 1 illustrates an example operating environment 100 having a debugging host computing device 102 (debugging host 102) and a multi-core device 104, each of which are capable of communicating data or packets over a debugging medium 106, such as a joint test action group (JTAG) interface, a universal serial bus (USB) cable, or an Ethernet cable. Although shown as a desktop computer, debugging host 102 may include, by way of example and not limitation, a server, laptop computer, tablet computer, an embedded device, and so on. As described herein, multi-core device 104 can be implemented as any computing device that utilizes multiple processing cores (cores), such as a system-on-chip (SoC). Multi-core device 104 is illustrated in FIG. 1 as a "quad-core" device that includes four cores, core-1, core-2, core-3, and core-4. It is to be appreciated, however, that multi-core device 104 can include any number of cores.

Debugging host 102 include processor(s) 108, computer-readable storage media 110 (CRM 110), and a hierarchical multi-core debugger 112 (debugger 112), which, in one implementation, is embodied on CRM 110. CRM 110 may include any suitable memory or storage device such as random-access memory (RAM), static RAM (SRAM), non-volatile RAM (NVRAM), read-only memory (ROM), or Flash memory useful to store data of applications, programs, firmware, and/or an operating system of debugging host 102. As described in more detail below, debugger 112 is configured to render a hierarchical multi-core debugger interface 114 (debugger interface 114) to enable debugging of multi-core device 104.

Debugging host 102 may also include JTAG port 116, USB port 118, and/or Ethernet port 120 which each provide an interface for communicating with multi-core devices, such as multi-core device 104. For example, programming host may receive core-specific information corresponding to each core of multi-core device 104 via ports 116, 118, and/or 120. Debugger 112 can then render core-specific UI components that contains the core-specific information received via ports 116, 118, or 120.

Hierarchical Multi-Core Debugger Interface

Debugger 112 is configured to render debugger interface 114 to enable debugging of multi-core device 104. In one or more implementations, the debugger interface is rendered such that core-specific user interface (UI) components corresponding to each core are each displayed with a unique visual characteristic. These unique visual characteristics act to visually associate the core-specific UI components with their respective core. The core-specific UI components contain core-specific information received from each core via debugging medium 106, and enable debugging of each core. Core-specific UI components can include, by way of example and not limitation, windows, menus, control buttons, and so on.

For example, after establishing a connection with multi-core device 104 via debugging medium 106, debugger 112 can assign a unique visual characteristic to each core of multi-core device 104. The unique visual characteristic may include, by way of example and not limitation, a unique color, a unique watermarks, and so on. For example, debugger 112 can assign the colors blue, green, red, and yellow to core-1, core-2, core-3, and core-4, respectively, of multi-core device 104.

Debugger 112 can then render debugger interface 114 by presenting core-specific UI components corresponding to the cores of multi-core device 104 using the unique visual characteristic assigned to each core. Continuing with the example above, debugger 112 can render debugger interface 114 such that core-specific UI components corresponding to core-1 are presented with a blue background, core-specific UI components corresponding to core-2 are presented with a green background, core-specific UI components corresponding to core-3 are presented with a red background, and core-specific components corresponding to core-4 are presented with a yellow background.

By presenting the core-specific UI components using unique visual characteristics, debugger interface 114 visually associates the core-specific UI components with their respective cores. Thus, unlike conventional debugger interfaces which either present information regarding a single core, or present information regarding multiple cores in a crowded and confusing manner, debugger interface 114 enables the user to easily associate each core-specific UI component with its respective core. This enables more efficient and accurate debugging of multi-core devices.

Alternately or additionally, the debugger interface is rendered such the core-specific UI components are displayed in core-specific windows corresponding to each core. For example, debugger 112 can arrange the core-specific UI components for each core into unique core-specific windows in debugger interface 114. In one or more implementations, the core-specific windows are rendered in debugger interface 114 using the unique visual characteristic assigned to each core, as described above.

FIG. 2 illustrates an example 200 of a hierarchical multi-core debugger interface 114 in accordance with one or more aspects. In this example, debugger 112 has established a connection with multi-core device 104, which includes four cores, core-1, core-2, core-3, and core-4.

In example 200, debugger interface 114 includes a global window 202 that includes core-independent UI components, such as a global menu 204 and a global command window 206. The core-independent UI components enable interaction with core-independent features of multi-core device 104.

Debugger interface 114 further includes core-specific windows 208, 210, 212, and 214 which are assigned to core-1, core-2, core-3, and core-4, respectively, of multi-core device 104. Each core-specific window includes core-specific UI components, such as windows, menus, and control buttons corresponding to the specific core. In one or more implementations, debugger 112 is configured to automatically group the core-specific UI components of each core into the core-specific windows without user intervention.

In this example, by way of example and not limitation, the core-specific UI components for core-1 in core-specific window 208 include a menu 216, control buttons 218, and sub-windows 220 and 222. Menu 216 includes menu items for "File", "Display", and "Run". Control buttons 218, identified by the letters "R", "M", "C", and "D", each enable the user to interact with core-1. Note that conventional debugger interfaces include such menu items and buttons adjacent to menu 204 of the global user interface. In the past, this grouping of all the menu items and buttons in same area was very confusing to user. Now, debugger 112 groups the core-specific menus items and buttons with each core in a core-specific window so that the components no longer convolute the main menu of the global window.

In this example, sub-window 220 is implemented as a "disassembly window", and sub-window 222 is implemented as a "register window". As described herein, a register window is configured to render information regarding a core, and a disassembly window is configured to render the current code that is executed and displayed to the user.

It is to be appreciated, however, that sub-windows within each core-specific window may also include alternate or additional windows, such as a source window. Disassembly, register, and source windows are known in the art, and thus are not discussed in more detail herein.

Similarly, core-specific window 210, associated with core-2, includes menu 224, control buttons 226, and sub-windows 228 and 230. Similarly, core-specific window 214, associated with core-4, includes menu 232, control buttons 234, and sub-windows 236 and 238.

In one or more implementations, debugger 112 renders each core-specific window using a unique visual characteristic assigned to each core. In example 200, the unique visual characteristics correspond to unique background colors of the core-specific window. For example, core-specific window 208 is rendered with a light gray background color, core-specific window 210 is rendered with a white background color, and core-specific window 214 is rendered with a dark gray background color.

It is to be appreciated that debugger 112 can use any type of background color scheme to uniquely identify each core-specific window (e.g., blue, green, yellow, red, and so on). Further, the unique visual characteristic is not limited to background color, but may also include unique watermarks, unique icons, unique title bars, unique frame colors, and so on. As described above, the unique visual characteristic may be assigned by debugger 112. In some cases, however, a type of the unique visual characteristic may be selected by the user. For example, the user may be able to select whether the unique visual characteristic should be unique colors or unique watermarks.

In one or more implementations, the core-specific windows of debugger interface 114 are configured to be grouped into a tabbed window. In example 200, for instance, the core-specific windows for core-2 and core-3 are grouped together into a single tabbed window. In FIG. 2, the single tabbed window presents UI components corresponding to core-2. However, to view UI components corresponding to core-3, the user can simply select the selectable tab of core-3. By enabling grouping of the core-specific windows, debugger 112 enables debugger interface 114 to display information regarding a greater number of cores in an organized fashion.

In one or more implementations, the core-specific windows are implemented as "free-floating" windows which can be selected and dragged to different areas of a display screen. Thus, the core-specific windows can be selected and dragged out of the global window. For example, in FIG. 2, a user can select core-specific windows 208, 210, 212, and/or 214 and drag the window out of the global window. This functionality can be especially useful when multiple display screens are used to render debugger interface 114, because the user can drag each core-specific window to a different display screen. When the user selects and drags a core-specific windows out of the global window, the core-specific window can keep its unique visual characteristic.

Techniques for Rendering a Hierarchical Multi-Core Debugger Interface

The following discussion describes techniques for rendering a hierarchical multi-core debugger interface. These techniques can be implemented using the previously described environments or entities, such as debugger 112 of FIG. 1 embodied on a debugging host 102. These techniques include methods illustrated in FIGS. 3 and 4, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and the example debugger interface of FIG. 2 by way of example. Such reference is not to be taken as limited to operating environment 100 but rather as illustrative of one of a variety of examples.

Figure 3:
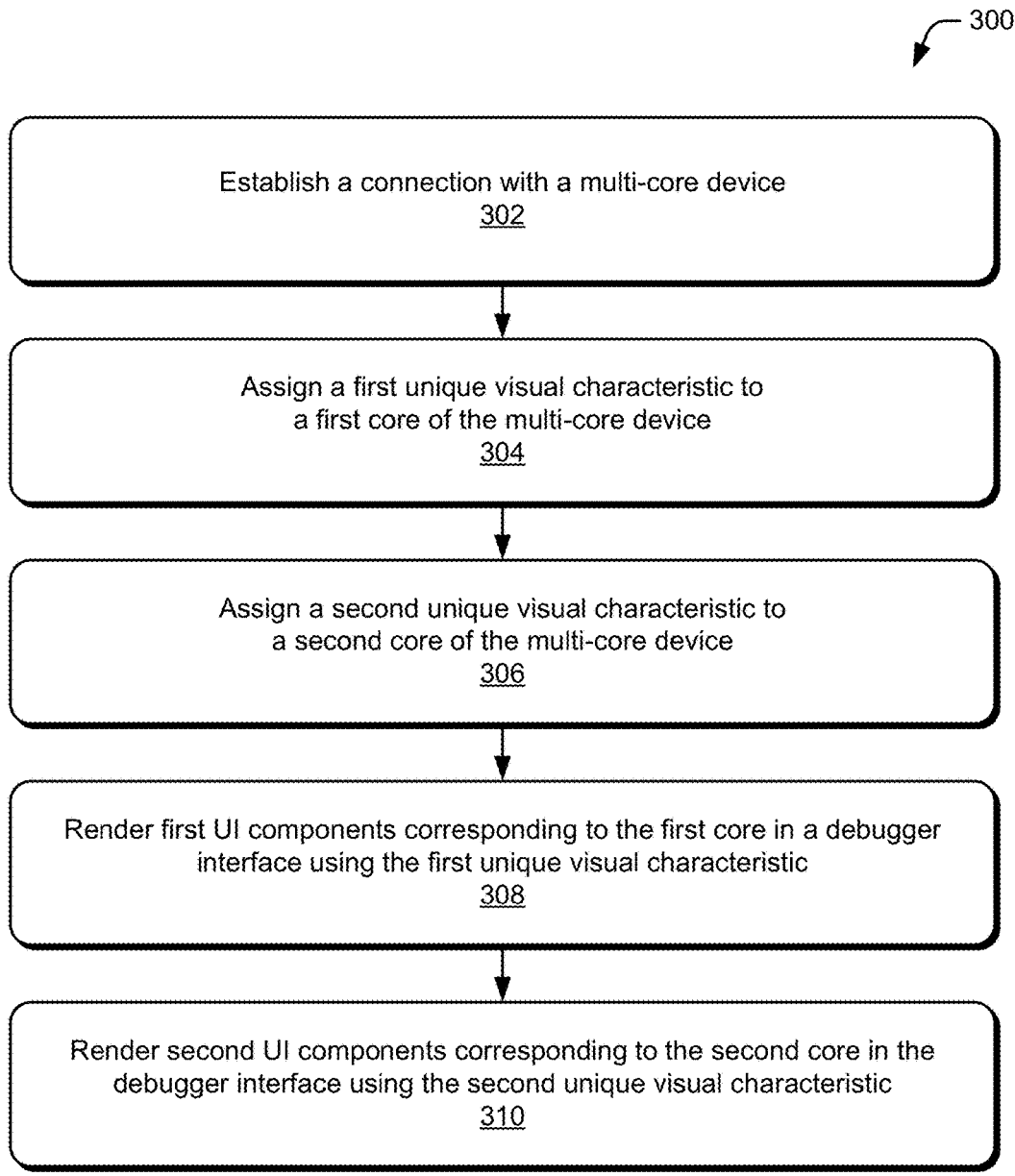
FIG. 3 illustrates a method for rendering a hierarchical multi-core debugger interface to enable debugging of a multi-core device.

FIG. 3 depicts a method 300 for rendering a hierarchical multi-core debugger interface to enable debugging of a multi-core device, including operations performed by debugger 112 of FIG. 1.

At 302, a connection is established with a multi-core device. For example, debugger 112 establishes a connection with multi-core device 104 via debugging medium 106.

At 304, a first unique visual characteristic is assigned to a first core of the multi-core device, and at 306 a second unique visual characteristic is assigned to a second core of the multi-core device. For example, debugger 112 assigns a first unique visual characteristic (e.g., a first color) to a first core of multi-core device 104, and a second unique visual characteristic (e.g., a second color) to a second core of multi-core device 104.

At 308, first UI components corresponding to the first core are rendered in a debugger interface using the first unique visual characteristic. For example, debugger 112 renders first UI components corresponding to the first core of multi-core device 104 in debugger interface 114 using the first unique visual characteristic (e.g., the first color). In FIG. 2, for example, the UI components corresponding to core-1 (menu 216, control buttons 218, and sub-windows 220 and 222) are rendered in debugger interface 114 using a light gray background color.

At 310, second UI components corresponding to the second core are rendered in the debugger interface using the second unique visual characteristic. For example, debugger 112 renders second UI components corresponding to the second core of multi-core device 104 in debugger interface 114 using the second unique visual characteristic (e.g., the second color). In FIG. 2, for example, the UI components corresponding to core-2 (menu 224, control buttons 226, and sub-windows 228 and 230) are rendered in debugger interface 114 using a white background color.

While method 300 describes rendering core-specific UI components for two cores of a multi-core device, it should be noted, of course, that debugger 112 can render core-specific UI components corresponding to one or more additional cores of multi-core device 104 in debugger interface 114 using one or more additional unique visual characteristics.

Figure 4:
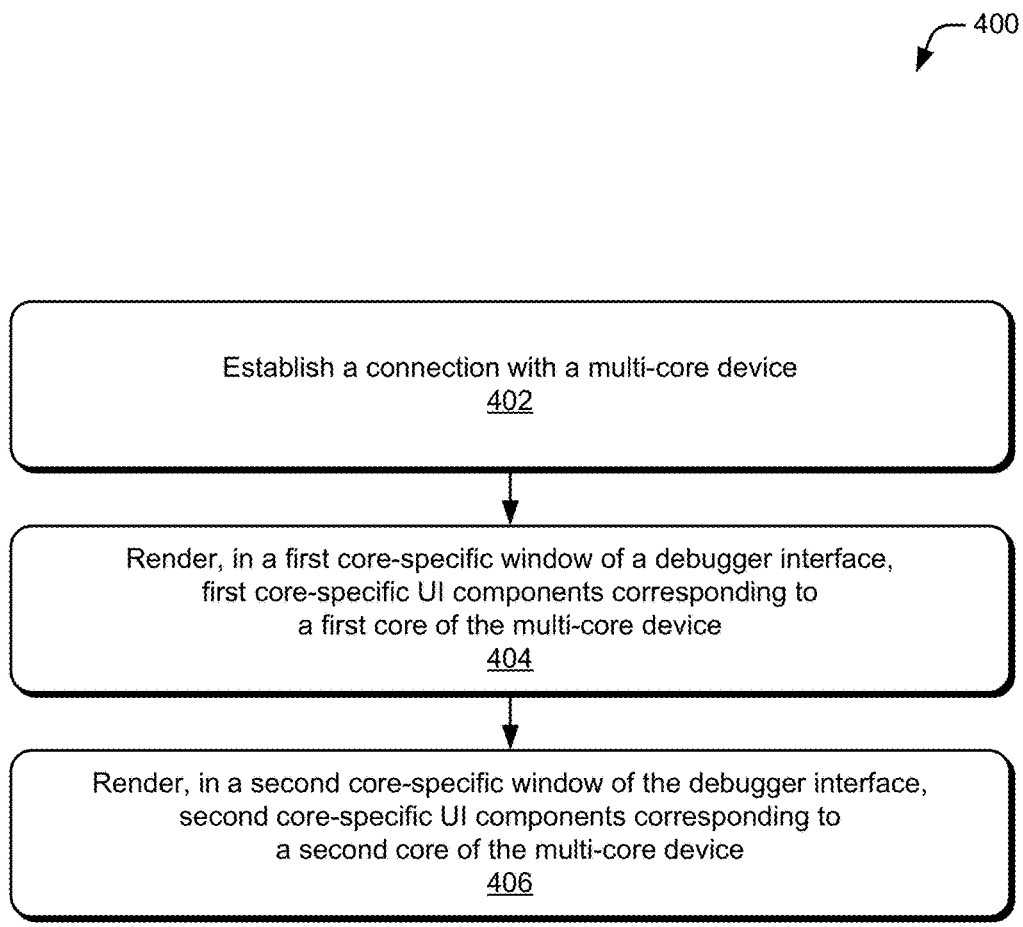
FIG. 4 illustrates an additional method for rendering a hierarchical multi-core debugger interface to enable debugging of a multi-core device

FIG. 4 depicts an additional method 400 for rendering a hierarchical multi-core debugger interface to enable debugging of a multi-core device, including operations performed by debugger 112 of FIG. 1.

At 402, a connection is established with a multi-core device. For example, debugger 112 establishes a connection with multi-core device 104 via debugging medium 106.

At 404, first core-specific UI components corresponding to a first core of the multi-core device are rendered in a first core-specific window of a debugger interface. For example, debugger 112 renders first core-specific UI components corresponding to a first core of multi-core device 104 in a first core-specific window of debugger interface 114. In FIG. 2, for example, core-specific UI components corresponding to core-1 (menu 216, control buttons 218, and sub-windows 220 and 222) are rendered in core-specific window 208.

At 406, second core-specific UI components corresponding to a second core of the multi-core device are rendered in a second core-specific window of the debugger interface. For example, debugger 112 renders second core-specific UI components corresponding to the second core of multi-core device 104 in a second core-specific window of debugger interface 114. In FIG. 2, for example, core-specific UI components corresponding to core-2 (menu 224, control buttons 226, and sub-windows 228 and 230) are rendered in core-specific window 210.

While method 400 describes rendering two core-specific windows, it should be noted, of course, that debugger 112 can render core-specific UI components corresponding to one or more additional cores of multi-core device 104 in one or more additional core-specific windows.

System-on-Chip

Figure 5:
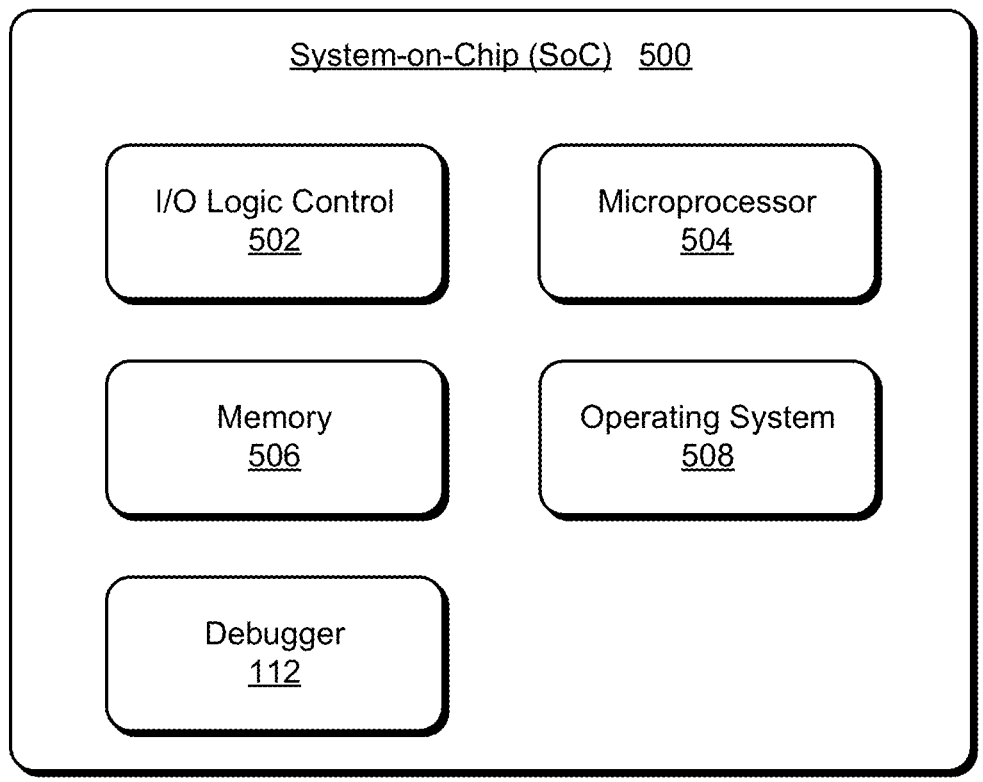
FIG. 5 illustrates a System-on-Chip (SoC) environment for implementing aspects of the techniques described herein.

FIG. 5 illustrates a System-on-Chip (SoC) 500, which can implement various embodiments described above. A SoC can be implemented in any suitable device, such as a video game console, IP enabled television, smart-phone, desktop computer, laptop computer, remote control, tablet computer, server, network-enabled printer, set-top box, printer, scanner, camera, picture frame, and/or any other type of device that may implement wireless connective technology.

SoC 500 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 500 can also include an integrated data bus (not shown) that couples the various components of the SoC for data communication between the components. A wireless communication device that includes SoC 500 can also be implemented with many combinations of differing components. In some cases, these differing components may be configured to implement concepts described herein over a wireless connection or interface.

In this example, SoC 500 includes various components such as an input-output (I/O) logic control 502 (e.g., to include electronic circuitry) and a microprocessor 504 (e.g., any of a microcontroller or digital signal processor). SoC 500 also includes a memory 506, which can be any type of RAM, low-latency nonvolatile memory (e.g., Flash memory), ROM, and/or other suitable electronic data storage. SoC 500 can also include various firmware and/or software, such as an operating system 508, which can be computer-executable instructions maintained by memory 506 and executed by microprocessor 504. SoC 500 can also include other various communication interfaces and components, communication components, other hardware, firmware, and/or software.

SoC 500 includes debugger 112. Examples of debugger 112, and the corresponding functionality of debugger 112, is described with reference to the respective components of the environment 100 shown in FIG. 1 and example 200 of FIG. 2.

Debugger 112, either independently or in combination with other entities, can be implemented as computer-executable instructions maintained by memory 506 and executed by microprocessor 504 to implement various embodiments and/or features described herein. Debugger 112 may also be provided integral with other entities of the SoC, such as integrated with one or both of I/O logic control 502 or any packet-based interface within SoC 500. Alternatively or additionally, debugger 112 and the other components can be implemented as hardware, firmware, fixed logic circuitry, or any combination thereof that is implemented in connection with the I/O logic control 502 and/or other signal processing and control circuits of SoC 500.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   establishing a connection with a multi-core device;
   rendering a global window that includes core-independent user interface (UI) components in a debugger interface, the core-independent UI components enabling interaction with core-independent features of the multi-core device and including at least one of a global menu or a global command window;
   rendering, in a first core-specific window within the global window of the debugger interface, first core-specific UI components corresponding to a first core of the multi-core device, wherein the first core-specific UI components contain information received via the connection that is associated with the first core and enable debugging of the first core; and
   rendering, in a second core-specific window within the global window of the debugger interface, second core-specific UI components corresponding to a second core of the multi-core device, wherein the second core-specific UI components contain information received via the connection that is associated with the second core and enable debugging of the second core.

2. The method of claim 1, wherein each of the first core-specific UI components corresponding to the first core and the second core-specific UI components corresponding to the second core respectively comprise one or more core-specific menus, one or more core-specific control buttons, and one or more core-specific sub-windows.

3. The method of claim 1, further comprising:
   assigning a first unique visual characteristic to the first core of the multi-core device; and
   assigning a second unique visual characteristic to the second core of the multi-core device,
   wherein rendering the first core-specific UI components corresponding to the first core further comprises rendering the first core-specific UI components corresponding to the first core in the first core-specific window using the first unique visual characteristic assigned to the first core, and wherein the rendering the second core-specific UI component corresponding to the second core further comprises rendering the second core-specific UI components corresponding to the second core in the second core-specific window using the second unique visual characteristic assigned to the second core.

4. The method of claim 3, wherein the first unique visual characteristic comprises a first color, and wherein the second unique visual characteristic comprises a second color, wherein the second color is different from the first color.

5. The method of claim 4, wherein the rendering the first core-specific UI components corresponding to the first core further comprises rendering the core-specific UI components corresponding to the first core in the first core-specific window such that a background color of the first core-specific window corresponds to the first color, and wherein the rendering the second core-specific UI components corresponding to the second core further comprises rendering the second core-specific UI components corresponding to the second core in the second core-specific window such that an additional background color of the second core-specific window corresponds to the second color.

6. The method of claim 1, wherein the first core-specific window and the second core-specific window can be selected and dragged out of the global window.

7. The method of claim 1, further comprising:
rendering, in a third core-specific window within the global window of the debugger interface, third core-specific UI components corresponding to a third core of the multi-core device; and
rendering, in a fourth core-specific window within the global window of the debugger interface, fourth core-specific UI components corresponding to a fourth core of the multi-core device.

8. The method of claim 1, further comprising rendering, in an n-th core-specific window within the global window of the debugger interface, n-th core-specific UI components corresponding to an n-th core of the multi-core device.

9. The method of claim 1, wherein the multi-core device comprises a system-on-chip (SoC).

10. One or more hardware-based computer-readable memory devices comprising computer-executable instructions that, when executed, implement a multi-core debugger to:
establish a connection with a multi-core device;
render a global window that includes core-independent user interface (UI) components in a debugger interface, the core-independent UI components enabling interaction with core-independent features of the multi-core device and including at least one of a global menu or a global command window;
render, in a first core-specific window within the global window of the debugger interface, first core-specific UI components corresponding to a first core of the multi-core device, the first core-specific UI components containing information received via the connection that is associated with the first core and enabling debugging of the first core; and
render, in a second core-specific window within the global window of the debugger interface, second core-specific UI components corresponding to a second core of the multi-core device, wherein the second core-specific UI components contain information received via the connection that is associated with the second core and enable debugging of the second core.

11. The one or more hardware-based computer-readable memory devices of claim 10, wherein each of the first core-specific UI components corresponding to the first core and the second core-specific UI components corresponding to the second core respectively comprise one or more core-specific menus, one or more core-specific control buttons, and one or more core-specific sub-windows.

12. The one or more hardware-based computer-readable memory devices of claim 10, wherein the multi-core debugger is further configured to:
assign a first unique visual characteristic to the first core of the multi-core device; and
assign second unique visual characteristic to the second core of the multi-core device,
wherein the multi-core debugger renders the first core-specific UI components corresponding to the first core by rendering the first core-specific UI components corresponding to the first core in the first core-specific window using the first unique visual characteristic assigned to the first core, and wherein multi-core debugger renders the second core-specific UI components corresponding to the second core by rendering the second core-specific UI components corresponding to the second core in the second core-specific window using the second unique visual characteristic assigned to the second core.

13. The one or more hardware-based computer-readable memory devices of claim 10, wherein the multi-core debugger is further configured to render, in an n-th core-specific window within the global window of the debugger interface, n-th core-specific UI components corresponding to an n-th core of the multi-core device.

14. A method comprising
establishing a connection with a multi-core device;
assigning a first unique visual characteristic to a first core of the multi-core device;
assigning a second unique visual characteristic to a second core of the multi-core device;
rendering a global window that includes core-independent user interface (UI) components in a debugger interface, the core-independent UI components enabling interaction with core-independent features of the multi-core device and including at least one of a global menu or a global command window;
rendering, within the global window of the debugger interface, first user interface (UI) components corresponding to the first core using the first unique visual characteristic, wherein the first UI components contain information received via the connection that is associated with the first core and enable debugging of the first core; and
rendering, within the global window of the debugger interface, second UI components corresponding to the second core using the second unique visual characteristic, wherein the second UI components contain information received via the connection that is associated with the second core and enable debugging of the second core.

15. The method of claim 14, wherein each of the first UI components and the second UI components respectively comprise one or more menus, one or more control buttons, and one or more sub-windows.

16. The method of claim 14, wherein the rendering first UI components corresponding to the first core further comprises rendering the first UI components in a first window within the global window of the debugger interface, and wherein the rendering the second UI components corresponding to the second core further comprises rendering the second UI components in a second window within the global window of the debugger interface.

17. The method of claim 14, further comprising:
assigning an n-th unique visual characteristic to an n-th core of the multi-core device; and
rendering, within the global window of the debugger interface, n-th UI components corresponding to the n-th core using the n-th unique visual characteristic.

18. The method of claim 16, wherein the first window and the second window can be selected and dragged out of the global window.

19. The method of claim 14, wherein the first unique visual characteristic comprises a first color, and wherein the second unique visual characteristic comprises a second color, wherein the second color is different from the first color.

20. The method of claim 14, wherein the multi-core device comprises a system-on-chip (SoC).

* * * * *